US00RE42797E

(19) United States
(12) Reissued Patent
Makino

(10) Patent Number: US RE42,797 E
(45) Date of Reissued Patent: Oct. 4, 2011

(54) DEVELOPER REPLENISHMENT APPARATUS

(75) Inventor: Yuichi Makino, Abiko (JP)

(73) Assignee: Canon Kabushiki Kaisha, Tokyo (JP)

(21) Appl. No.: 12/130,055

(22) Filed: May 30, 2008

Related U.S. Patent Documents

Reissue of:
(64) Patent No.: 7,139,516
Issued: Nov. 21, 2006
Appl. No.: 11/242,938
PCT Filed: Oct. 5, 2005

(30) Foreign Application Priority Data

Oct. 20, 2004 (JP) ..... 2004-306264

(51) Int. Cl.
*G03G 15/08* (2006.01)
(52) U.S. Cl. ..... 399/258; 399/120; 399/256
(58) Field of Classification Search ..... 399/120, 399/256, 258
See application file for complete search history.

(56) References Cited

U.S. PATENT DOCUMENTS

| | | | |
|---|---|---|---|
| 4,937,625 | A | 6/1990 | Kato et al. |
| 5,005,517 | A | 4/1991 | Fukui et al. |
| 5,784,669 | A | 7/1998 | Miura et al. |
| 6,185,401 | B1 | 2/2001 | Kanamori et al. |
| 6,456,809 | B1 | 9/2002 | Sekiguchi |
| 7,024,151 | B2 | 4/2006 | Katoh et al. |
| 7,110,707 | B2 | 9/2006 | Nishitani |
| 2005/0002700 | A1 | 1/2005 | Nishitani |
| 2005/0207794 | A1 | 9/2005 | Katoh et al. |

FOREIGN PATENT DOCUMENTS

| | | | |
|---|---|---|---|
| JP | 3-217879 | | 9/1991 |
| JP | 6-83196 | | 3/1994 |
| JP | 11-160985 | A | 6/1999 |
| JP | 11-184232 | A | 7/1999 |
| JP | 11-194600 | | 7/1999 |
| JP | 11-223985 | A | 8/1999 |
| JP | 2000-267419 | A | 9/2000 |

OTHER PUBLICATIONS

Notification of Reason for Rejection, the date of dispatch being indicated as Aug. 17, 2010, in counterpart Japanese Application No. 2004-306264.

*Primary Examiner* — David M. Gray
*Assistant Examiner* — Joseph S Wong
(74) *Attorney, Agent, or Firm* — Fitzpatrick, Cella, Harper & Scinto

(57) ABSTRACT

The developer replenishment apparatus includes a first developer container for accommodating the developer for replenishment, a first conveyance member disposed in the first developer container to discharge the developer for replenishment through a first opening of the first developer container, a second developer container for receiving the developer for replenishment discharged from the first opening, an agitating member disposed in the second developer container to agitate the developer for replenishment, a second conveyance member disposed in the second developer container to discharge the developer for replenishment through a second opening of the second developer container toward the developing apparatus, and a driving device which does not drive the second conveyance member but drives the agitating member when driving the first conveyance member. The bulk density of the developer is thereby stabilized to make possible replenishment with the developer at high accuracy.

5 Claims, 14 Drawing Sheets

DEVELOPER REPLENISHMENT APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a developer replenishment apparatus for supplying a developer to image forming apparatuses such as copying machines, facsimile machines and printers which form an electrostatic latent image on an image bearing member by an electrophotographic or electrostatic recording method or otherwise, and turns this electrostatic latent image into a visualized image (toner image) with the developer accommodated in a developing apparatus.

2. Related Background Art

In a conventional image forming apparatus, whether it uses a one-component developer or a two-component developer, when the development of electrostatic latent images brings down the quantity of the developer in the developing apparatus below its prescribed level, a developing apparatus 208 is replenished with a toner from a developer replenishment apparatus in which a developer for replenishment (toner) is stored, namely, a hopper 200, as in one example shown in FIG. 14 appended to the present application.

Usually, the hopper 200 is provided with a toner cartridge (first developer container) 201 for supplying new toner to a developing apparatus 208 and a buffer part (second developer container) 202 for storing the toner supplied from the toner cartridge 201. When the quantity of the toner in the buffer part 202 has decreased, a toner sensor (not shown) disposed in the buffer part 202 detects the toner shortage, and toner is supplied from the toner cartridge 201 to keep the quantity of the toner in the buffer part 202 constant.

The conventional buffer part 202 is often oblongly shaped. In the hopper 200 of this type, the toner supplied from the toner cartridge 201 drops by gravity into and accumulates in the buffer part 202, and is supplied to the developing apparatus 208 via a toner supply inlet 204 by the bottom face of the buffer part 202 and a conveyance screw 205 provided within a replenishment pipe 203 communicating with this bottom face.

However, this system of filling the buffer part 202 with toner by gravity is susceptible to bulk density variations of the toner in the buffer part 202 while the toner is accumulating in the buffer part 202, and this could invite fluctuations in the quantity of the toner supplied to the developing apparatus 208.

A proposed solution to this problem is to circulate the toner in a shallow buffer part as disclosed in Japanese Patent Application Laid-Open No. [H03-2178789] *H03-217879*.

In this system, as shown in FIG. 15, after the toner is supplied from the toner cartridge to the toner supplying position 92 of the buffer part 202, the toner is evened up by being circulatively conveyed within the buffer part 202 by agitating screws 89a and 89b. The toner, which is then conveyed by a conveyance screw 89c to an opening 90, is further conveyed to the developing apparatus via a replenishment pipe (not shown). This system, since it can better suppress bulk density fluctuations within the buffer than the method of filling the buffer part by gravity, has an effect of reducing fluctuations in the quantity of toner supplied to the developing apparatus.

However, the hopper having the conventional buffer part to be filled with the toner by circulative conveyance involves the following problems.

In a color image forming apparatus, in order to suppress density variations of output images, fluctuations in the quantity of replenishment from the hopper to the developing apparatus have to be eliminated.

One of the means to achieve the purpose is the use of a less fluid toner, whose bulk density is not readily varied by external disturbance, such as a difference in environment or a state of being let stand for a long period. However, since the use of such a low-fluidity toner makes it impossible to even up the toner with agitating screws in the conventional circulative conveyance type buffer part at other times than when replenishing the developing apparatus with the toner, the heap of the toner will remain uncollapsed and build up in the toner replenishment position, sometimes blocking the toner flow.

Even if the toner flow is not blocked, it may be prevented from a position where it can be detected by the toner sensor with the consequence that erroneous emptiness of the toner cartridge may be detected even though there is some remaining toner in the cartridge.

Moreover, in spite of the use of the low-fluidity toner, the difference in bulk density between the toner replenishment position and elsewhere may become too large, rather inviting increased fluctuations of the quantity of replenishment.

SUMMARY OF THE INVENTION

An object of the present invention is to provide a developer replenishment apparatus permitting replenishment with a developer at high accuracy by stabilizing the bulk density of the developer in a second developer container disposed midway on a developer replenishment path from a first developer container to a developing apparatus.

The object of the invention in more specific terms is to provide a developer replenishment apparatus for supplying a developer for replenishment to a developing apparatus to develop an electrostatic image formed on an image bearing member with the developer, comprising a first developer container for accommodating the developer for replenishment; a first conveyance member disposed in the first developer container to discharge the developer for replenishment through a first opening of the first developer container; a second developer container for receiving the developer for replenishment discharged from the first opening; an agitating member disposed in the second developer container to agitate the developer for replenishment; a second conveyance member disposed in the second developer container to discharge the developer for replenishment through a second opening of the second developer container toward the developing apparatus; and a driving device which drives the agitating member without driving the second conveyance member when driving the first conveyance member.

Other objects of the invention will become more apparent from the following detailed description when taken in conjunction with accompanying drawings.

DETAILED DESCRIPTION OF THE EMBODIMENTS

The image forming apparatus according to the present invention will be described in further detail below with reference to accompanying drawings.

First Embodiment

Figure 1:
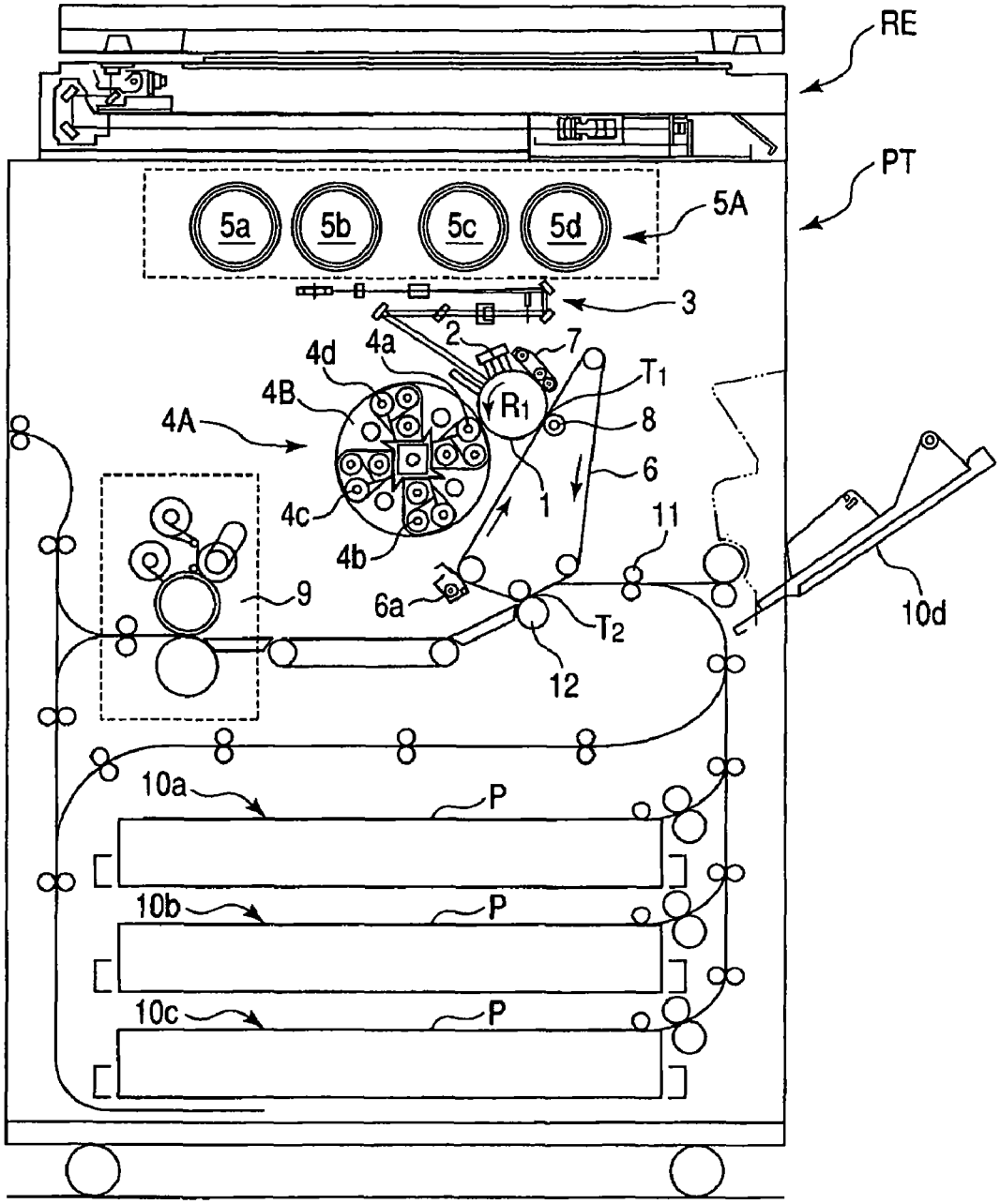
FIG. 1 is a sectional view showing a schematic configuration of an image forming apparatus, which is a preferred embodiment of the present invention.

First, FIG. 1 shows a schematic configuration of the image forming apparatus, which is a preferred embodiment of the present invention.

The image forming apparatus embodying the invention in this mode is a multi-color image forming apparatus provided with a reader part RE and a printer part PT, and the printer part PT has charging means 2, exposure means 3, a rotary developing apparatus 4A capable of rotating, an intermediate transferring belt (intermediate transferring member) 6 and cleaning means 7 arranged around a photosensitive drum 1 as the image bearing member.

The rotary developing apparatus 4A has a plurality of developing devices 4 mounted on a rotary member, namely a developing rotary 4B. Thus, the developing devices 4 which are mounted comprise a magenta (M) color developing device 4a, a cyan (C) color developing device 4b, a yellow (Y) color developing device 4c and a black (Bk) color developing device 4d.

Referring to FIG. 1, the photosensitive drum 1 is rotated by driving means (not shown) in the direction of arrow R1, and the surface of the photosensitive drum 1 is electrically charged by a charging roller 2 as the charging means. Next, an electrostatic latent image of a first color is formed by the exposure means 3 on the surface of the photosensitive drum 1. Thus, image information read by the reader part RE is converted by the laser output part of the exposure means 3 into optical signals (laser beams) of different colors, which are reflected by a polygonal mirror and, after they go through a lens and are reflected by a turnaround mirror, the surface of the photosensitive drum 1 is thereby exposed to light.

In the rotary developing apparatus 4A, one of the color developers 4 including the magenta (M) color developing device 4a, the cyan (C) color developing device 4b, the yellow (Y) color developing device 4c and the black (Bk) color developing device 4d is arranged in the developing position opposite the photosensitive drum 1 by rotational control of the developing rotary 4B.

The electrostatic latent image on the photosensitive drum 1 undergoes toner development by the developing device 4 placed in the developing position, and is visualized into a toner image. The toner image thereby obtained undergoes a primary transfer onto an intermediate transferring belt 6 by primary transferring means 8 in a primary transferring position T1.

The formation of the electrostatic latent image and the toner image and the primary transfer of the toner image onto the intermediate transferring belt 6 are successively carried out with each of the toners of four colors, and a toner image of four colors, superposed one over another, is thereby formed on the intermediate transferring belt 6.

On the other hand, a transfer sheet P, which is the recording medium is fed from one of cassettes 10a, 10b and 10c or a multiple manual feeder 10d, conveyed and, after being subjected to skew correction and timed by a registration roller 11, delivered toward a secondary transferring position T2 where secondary transferring means 12 is disposed.

The toner image formed on the intermediate transferring belt 6 undergoes a collective secondary transfer to the transfer sheet P conveyed by the secondary transferring roller 12 as the secondary transferring means and the intermediate transferring belt 6. The transfer sheet P to which the color toner image has been transferred is conveyed to a fixing apparatus 9, which fixes the toner to the transfer sheet P. The sheet having undergone toner fixation is either ejected or directed to a double-side image formation process.

The residual toner from the secondary transfer on the intermediate transferring belt 6, which did not undergo the secondary transfer to the transfer sheet P, is collected with intermediate transferring belt cleaning means 6a disposed on the intermediate transferring belt 6.

On the photosensitive drum 1 after the primary transfer, there also remains a residual toner which did not undergo the primary transfer to the intermediate transferring belt 6. This residual toner on the photosensitive drum 1 is removed and collected by a cleaning apparatus 7, and the photosensitive drum 1 is made available for the next image forming process.

Next, a toner replenishment apparatus for replenishing the developing devices 4 with developers for replenishment (hereinafter referred to as simply "toners") will be described with reference to FIG. 2 through FIG. 8.

In this embodiment of the invention, a toner replenishment apparatus 5A provided in the image forming apparatus has toner cartridges 5 as first developer containers accommodating toners, namely the toner cartridges 5 (5a, 5b, 5c and 5d).matching the developing devices 4 (4a, 4b, 4c and 4d) in this particular embodiment, toner idler parts 13 (13a, 13b, 13c and 13d) and replenishment pipes 14 (14a, 14b, 14c and 14d).

Each of the developing devices 4 (4a, 4b, 4c and 4d) is replenished with new toner by one or another of the toner cartridges 5 (5a, 5b, 5c and 5d) in the required quantity when the developing device, being rotated by the developing rotary 4B, has been brought to the developing position.

Then, since this embodiment uses the rotary developing apparatus 4A as the developing apparatus, any of the developing devices 4 mounted on the developing rotary 4B can receive the toner only in its posture in the developing position (or in some other specific position).

Figure 2:
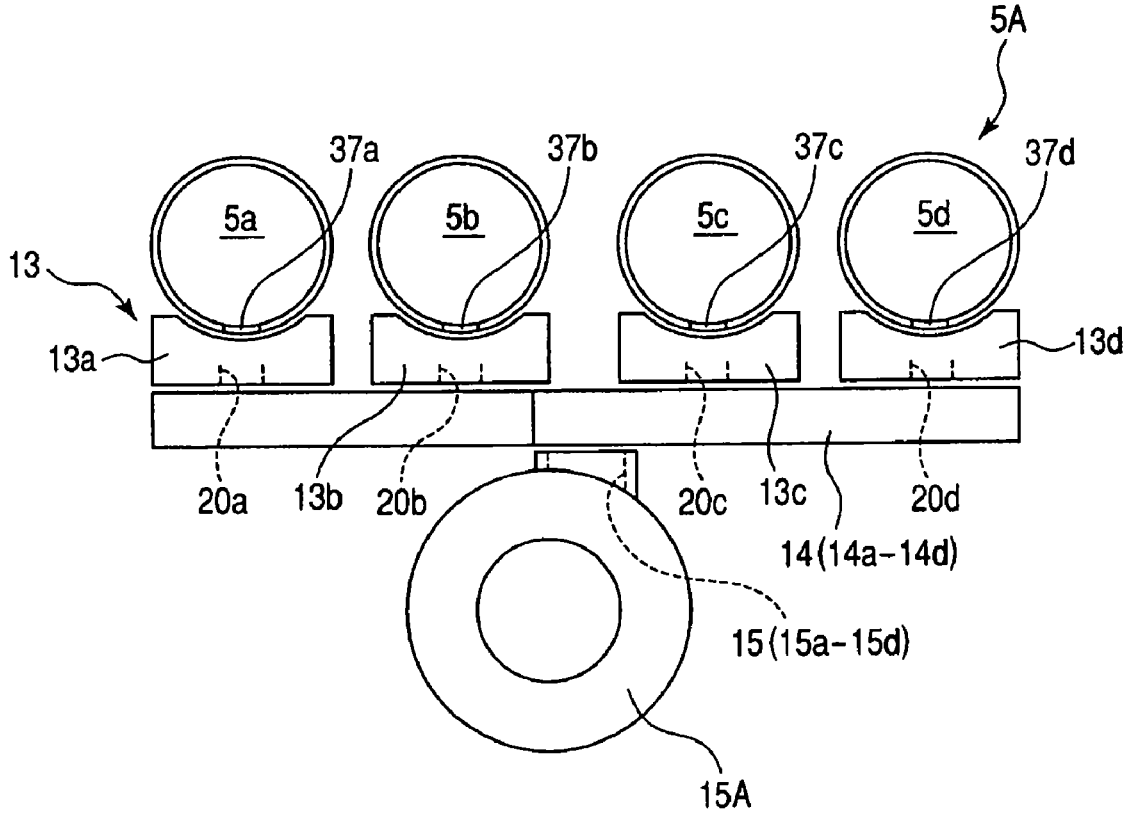
FIG. 2 is a front view showing a toner replenishment apparatus in the preferred embodiment of the invention.
Figure 3:
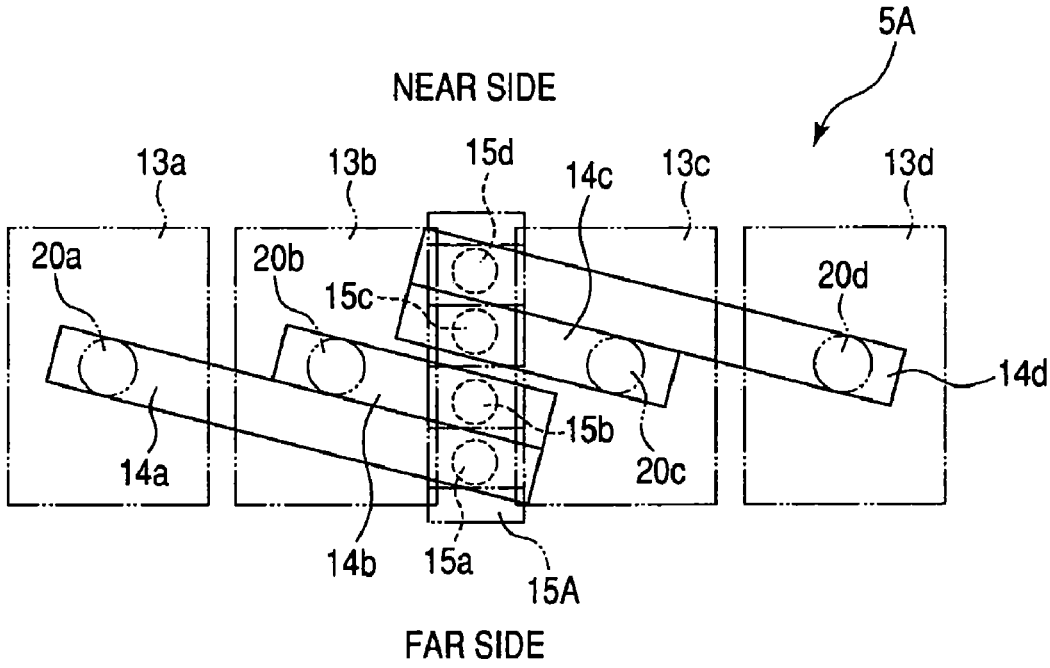
FIG. 3 is a bottom view showing the toner replenishment apparatus in the embodiment of the invention.
Figure 4:
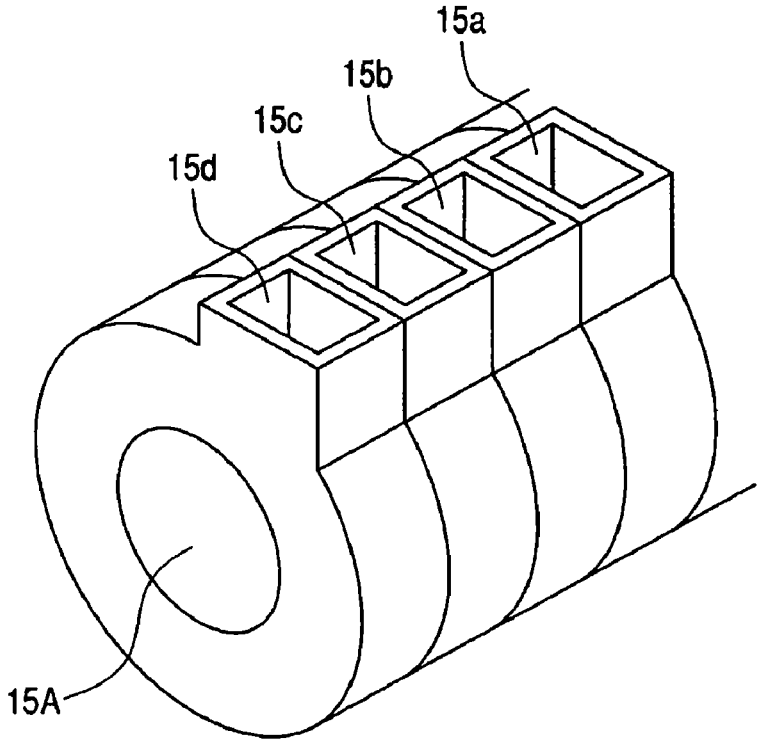
FIG. 4 is a perspective view showing a toner supply part in the embodiment of the invention.

Therefore in this embodiment, the toners are handed over to the developing devices 4 and the developing rotary 4B via a toner supply part 15A arranged on the near side of the developing rotary 4B in the image forming apparatus as shown in FIG. 2 through FIG. 4. FIG. 2 is a front view showing the toner replenishment apparatus 5A and the toner supply part 15A; FIG. 3, a bottom view showing the toner replenishment apparatus 5A; and FIG. 4, a perspective view of the toner supply part 15A as seen from above.

At the top of the toner supply part 15A, there are provided, each matching one or another of the developing devices 4, toner inlets 15 (15a, 15b, 15c and 15d) for receiving toners from the toner replenishment apparatus 5A via the replenishment pipes 14 (14a, 14b, 14c and 14d).

Between the toner supply part 15A and the rotary developing apparatus 4A, there is formed a developer conveyance path for replenishing the developer placed in the developing position with the toner, matched in position with the developers. The toner for replenishment supplied to each of the toner inlets 15 is fed to the developing device 4 placed in the developing position. Since the configuration involving such a toner supply part 15A and rotary developing apparatus 4A is known to persons skilled in the art as it is described in, for instance, Japanese Patent Application Laid-Open H 6-83196, and moreover does not constitute a particular feature of the present invention, any further description is dispensed with.

Figure 5:
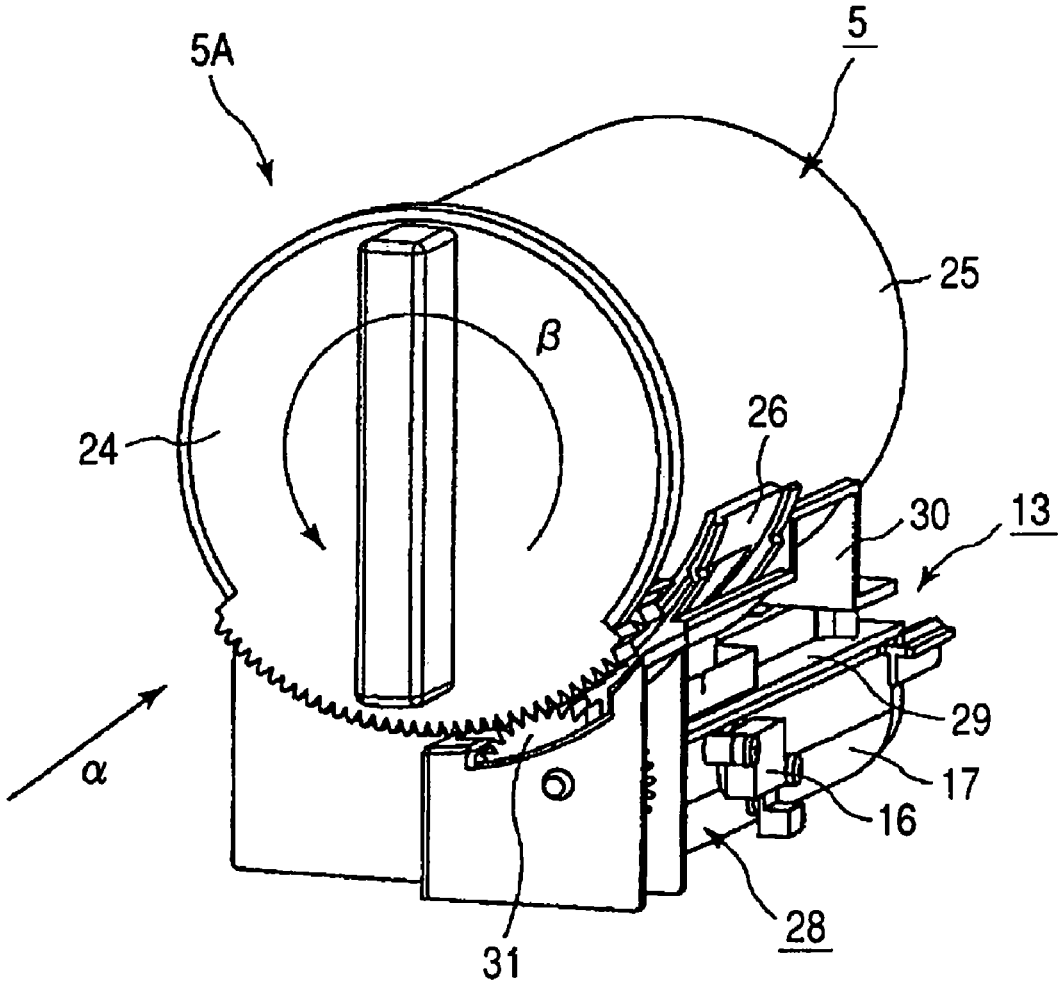
FIG. 5 is a perspective view showing a toner replenishment apparatus in the embodiment of the invention.
Figure 6:
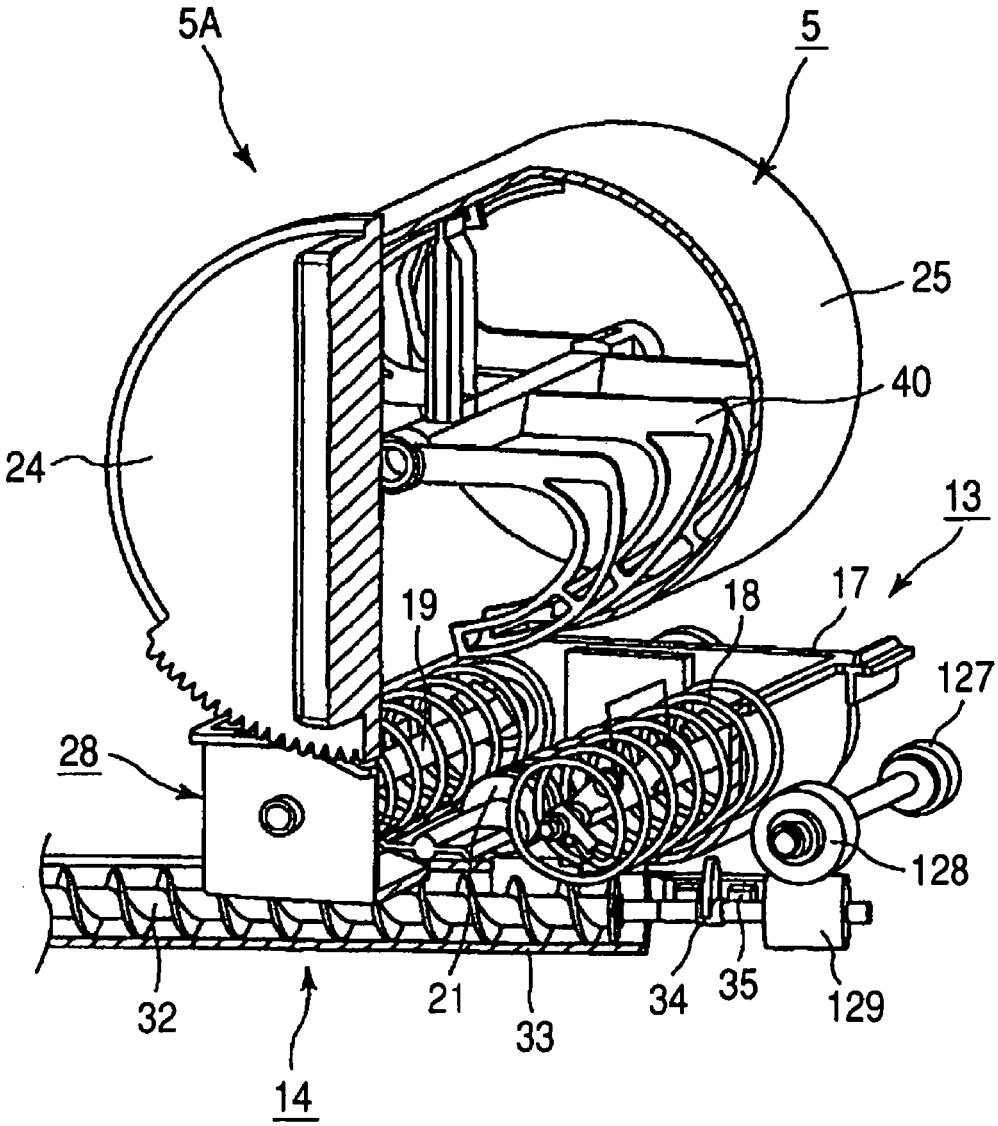
FIG. 6 is a partial cutaway view of the toner replenishment apparatus in the embodiment of the invention.

Next, the supply of toners for replenishment from the toner cartridges 5 (5a, 5b, 5c and 5d) to the toner supply part 15A which constitutes a specific feature of the invention will be outlined with additional reference to FIG. 5 through FIG. 8. FIG. 5 and FIG. 6 are a perspective view and a partial cutaway view, respectively, of a hopper of any one color in the toner replenishment apparatus 5A. FIG. 7A shows the shutter portion of a toner cartridge 5 in the closed state of the shutter, and FIG. 7B, the shutter portion of the toner cartridge 5 in the open state of the shutter.

The toner replenishment apparatus 5A is disposed above the toner supply part 15A and on the near side of the image forming apparatus and, as stated above, is provided with the toner cartridges 5, the toner idler parts 13 and the replenishment pipes 14.

When a toner sensor 16 (FIG. 5) detects the absence of toner, the toners contained in the toner cartridges 5 (5a, 5b, 5c and 5d) are conveyed through cartridge replenishment inlets 37 (37a, 37b, 37c and 37d) disposed in the respective lower parts of the toner cartridges 5 to the toner idler parts 13 (13a, 13b, 13c and 13d) until the toner sensor 16 senses the presence of toner.

Certain quantities of toner are stored in the toner idler parts 13 and, when a toner replenishment signal is received from the image forming apparatus, toners are discharged in prescribed quantities through replenishment inlets 20 (20a, 20b, 20c and 20d) in the toner idler parts 13 into the replenishment pipes 14 (14a, 14b, 14c and 14d) as long as the developing rotary 4B is at halt in the developing position.

The replenishment pipes 14 are driven by the same driving power as the toner idler parts 13. They accept toners from the toner idler parts 13, and discharge the toner into the toner supply part 15A.

The toner supply part 15A has the inlets 15 (15a, 15b, 15c and 15d) as stated above, and each of the inlets 15 communicates via a developer conveyance path (not shown) with one or another of the developing devices 4 disposed in the developing rotary 4B.

In this embodiment, the inlets 15 are arranged in the order of yellow 15a, magenta 15b, cyan 15c and black 15d from the image forming apparatus inward.

Since this embodiment uses the developing devices 4A of a rotational development system, any of the developing devices 4 mounted on the developing rotary 4B can receive the toner only in its posture in the developing position (or in any other specific position). Therefore, the replenishing action is repeated in succession with the developing rotary 4B turning from one color to next.

Next, the detailed configuration of the toner cartridges 5 and the toner idler parts 13 in this embodiment will be described with reference to FIG. 5 through FIG. 8. FIG. 5 shows a perspective view of a hopper 3 of any one color, and FIG. 6, a section of the same.

Each of the toner cartridges 5 is provided with a first developer container, namely a toner container 25 for storing a toner, a handle 24 for opening and closing a buffer shutter 26 to be described afterwards, a cartridge shutter 27 for blocking a replenishment inlet 37 provided on the toner container 25, and agitating vanes 36, which are first agitating means for agitating the toner in the toner cartridge 5 and discharging it through the cartridge replenishment inlet 37.

Each of the toner idler parts 13 has a supporting base 30 for supporting a toner cartridge 5, a buffer part 28 for storing a toner, and a buffer cover 29 for blocking the top face of the buffer part 28. The buffer part 28 is provided with a buffer container 17 as a second developer container for storing the toner, first and second agitating screws 18 and 19 as second agitating means for agitating the toner in the buffer part 28 and circulatively conveying it, a conveyance screw 21 as conveyance means for conveying the toner in the buffer part 28 and discharging it into the replenishment pipe 14, and the toner sensor 16 for detecting the presence or absence of any toner in the buffer part 28. In this embodiment, the first and second agitating screws 18 and 19 are paired and arranged symmetrically on the two sides of the conveyance screw 21.

Each of the replenishment pipes 14 is provided with a replenishment screw 32 for conveying the toner discharged from the buffer part 28 to the toner supply part 15A, a pipe part 33 covering the replenishment screw 32, and a flag 34 and a photo-interrupter 35 both for counting the number of revolutions of the replenishment screw 32.

These flag 34 and photo-interrupter 35 enable the replenishment screw 32 to convey a one-pitch equivalent of the toner per revolution.

Usually with a screw like the screw 32, the positional relationship of its vanes to the opening causes the quantity of replenishment to pulsate and repeat ups and downs even during a single turn. In view of this problem, to make this embodiment less susceptible to the influence of pulsation, the screw 32 is rotated always one round at a time to keep constant the positions of vanes relative to the opening.

Each of the toner idler parts 13 is provided with a shutter opening-closing gear 31 and an idler gear 36, and the buffer shutter 26 disposed on the supporting base 30 is opened and closed by shutter opening-closing actions to be described afterwards.

Figure 7B:
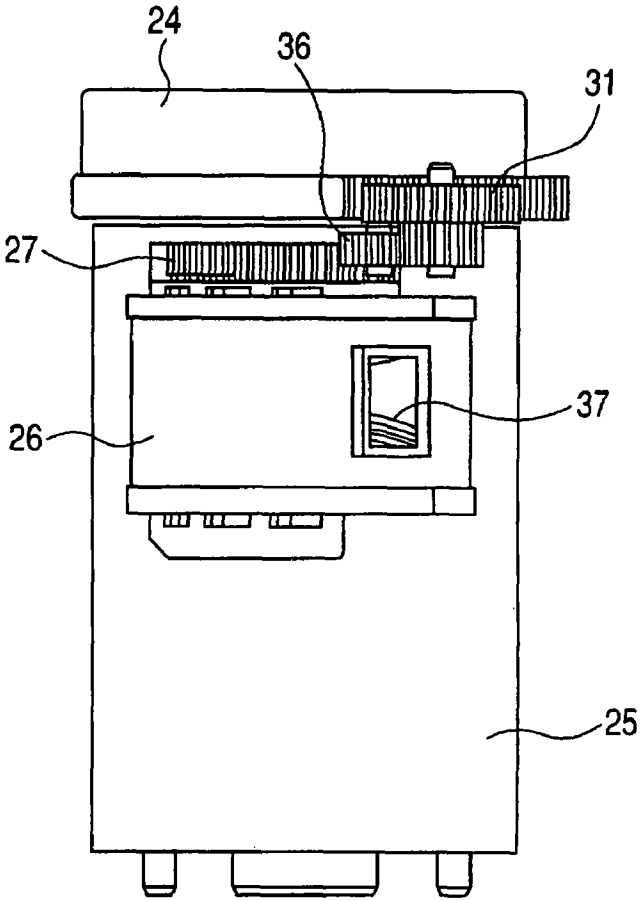
FIG. 7A shows the shutter portion of a toner cartridge 5 in the closed state of the shutter, and FIG. 7B, the shutter portion of the toner cartridge 5 in the open state of the shutter.
Figure 7A:
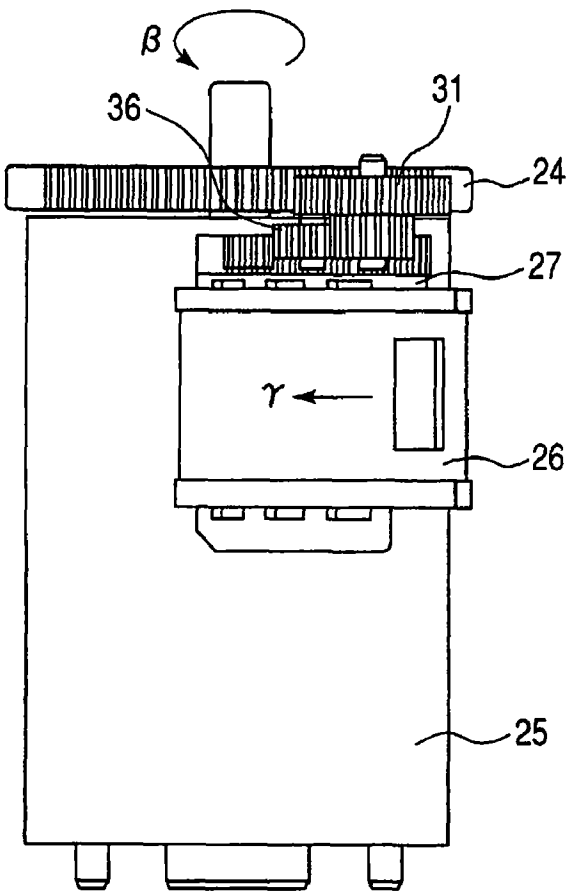

Next will be described the shutter opening-closing actions of the toner cartridges 5 and the toner idler parts 13 in this embodiment with reference to FIGS. 7A and 7B.

Each of the toner cartridges 5 is inserted into one of the toner idler parts 13 by being slid in the direction of arrow $\alpha$ (FIG. 5). When the toner cartridge 5 is inserted into a prescribed position, the handle 24 engages with the shutter opening-closing gear 31 and the cartridge shutter 27 engages with a groove (not shown) cut in the buffer shutter 26.

Next, when the user turns the handle 24 by about 90° in the direction of arrow $\beta$, which is the opening direction of the shutter, the shutter opening-closing gear 31 is turned, and the driving power is transmitted to the idler gear 36 to slide the cartridge shutter 27 in the direction of arrow Y.

Then, since the buffer shutter 26 is engaged with the cartridge shutter 27 as mentioned above, it slides in the direction of arrow Y together with the cartridge shutter 27. This establishes communication between the replenishment inlet 37 provided in the toner container 25 and the opening of the buffer shutter 26. By turning the agitating vanes 36 in this state, the toner is discharged from the toner cartridges 5 to the toner idler parts 13. Since the configuration involving such a buffer shutter 26 and cartridge shutter 27 is known to persons skilled in the art as it is described in, for instance, Japanese Patent Application Laid-Open No. H11-194600, and moreover does not constitute a particular feature of the present invention, any further description is dispensed with.

Next will be described the flow of the toner within the buffer part 28 in this embodiment with reference to FIG. 8.

The toner discharged from any of the toner cartridges 5 is fed into a toner replenishment position 23, and conveyed by the first agitating screw 18 in the direction of arrow a. Then, as the toner is conveyed deep into the buffer container 17, it is then conveyed in the direction of arrow b by a paddle 18a provided on the first agitating screw 18.

The conveyance screw 21 is disposed at the center of the buffer container 17. The conveyance screw 21 conveys the toner delivered by the first agitating screw 18 in the direction of arrow d, and the toner is discharged from a discharge outlet 20 disposed substantially at the center of the buffer container 17 into the replenishment pipes 14.

Out of the toner conveyed by the first agitating screw 18, the surplus which was not conveyed by the replenishment screw 32 is shoved out in the direction of arrow c, and conveyed to the second agitating screw 19.

The surplus toner conveyed to the second agitating screw 19 is further conveyed by the second agitating screw 19 in the direction of arrow e. When the toner reaches the near side of the buffer container 17, it is conveyed by a paddle 19a disposed on the second agitating screw 19 in the direction of arrow f.

Another paddle 21a is disposed on the near side of the conveyance screw 21, and the surplus toner is returned by this paddle 21a in the direction of arrow g to the toner replenishment position 23.

By repeating this sequence of actions, the toner is circulated within the buffer part 28.

Next will be described the drive system arrangement and the drive transmission path in this embodiment with reference to FIG. 9 through FIG. 11.

Figure 9:
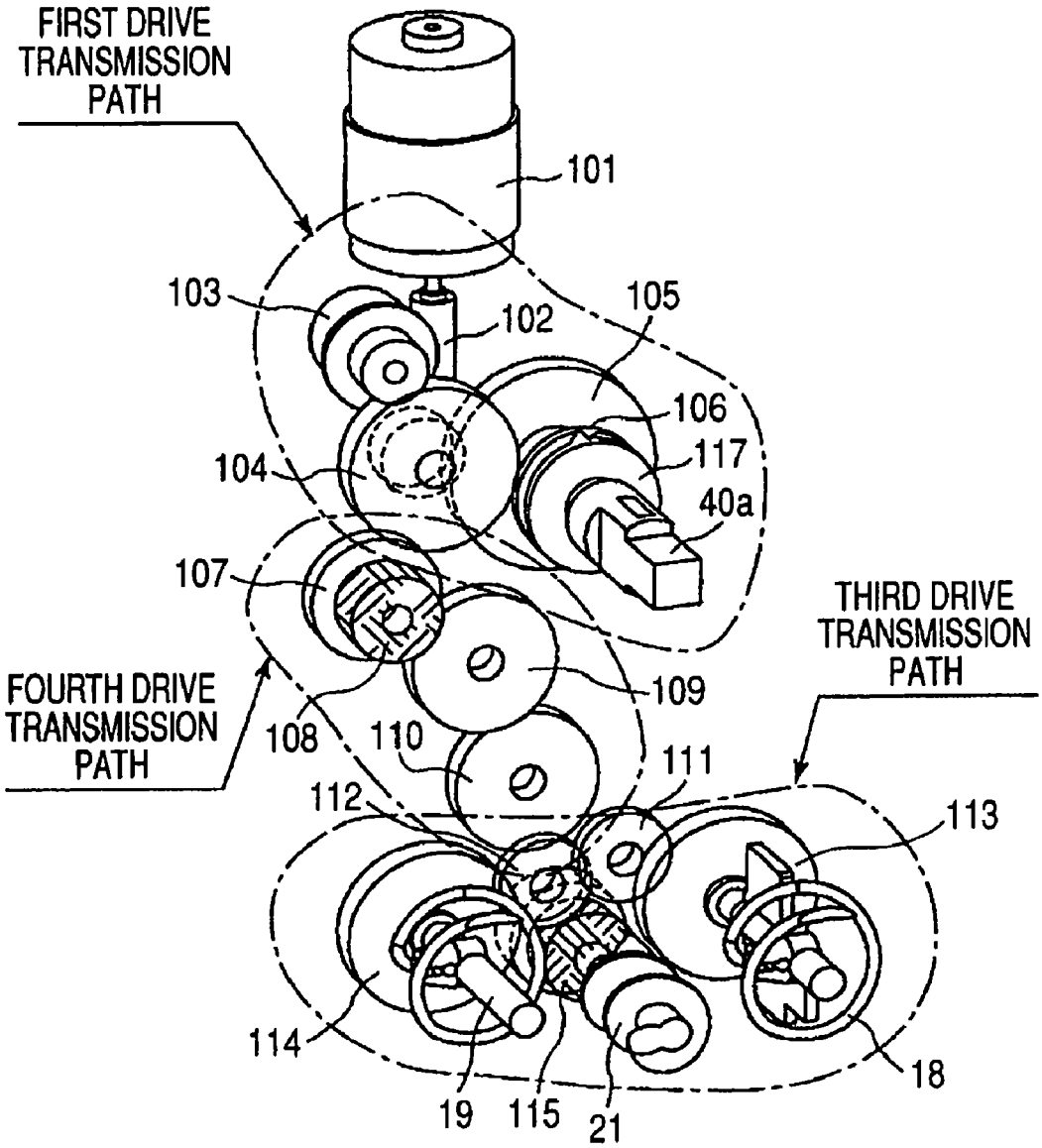
FIG. 9 illustrates driving of the toner replenishment apparatus by a cartridge motor.
Figure 10:
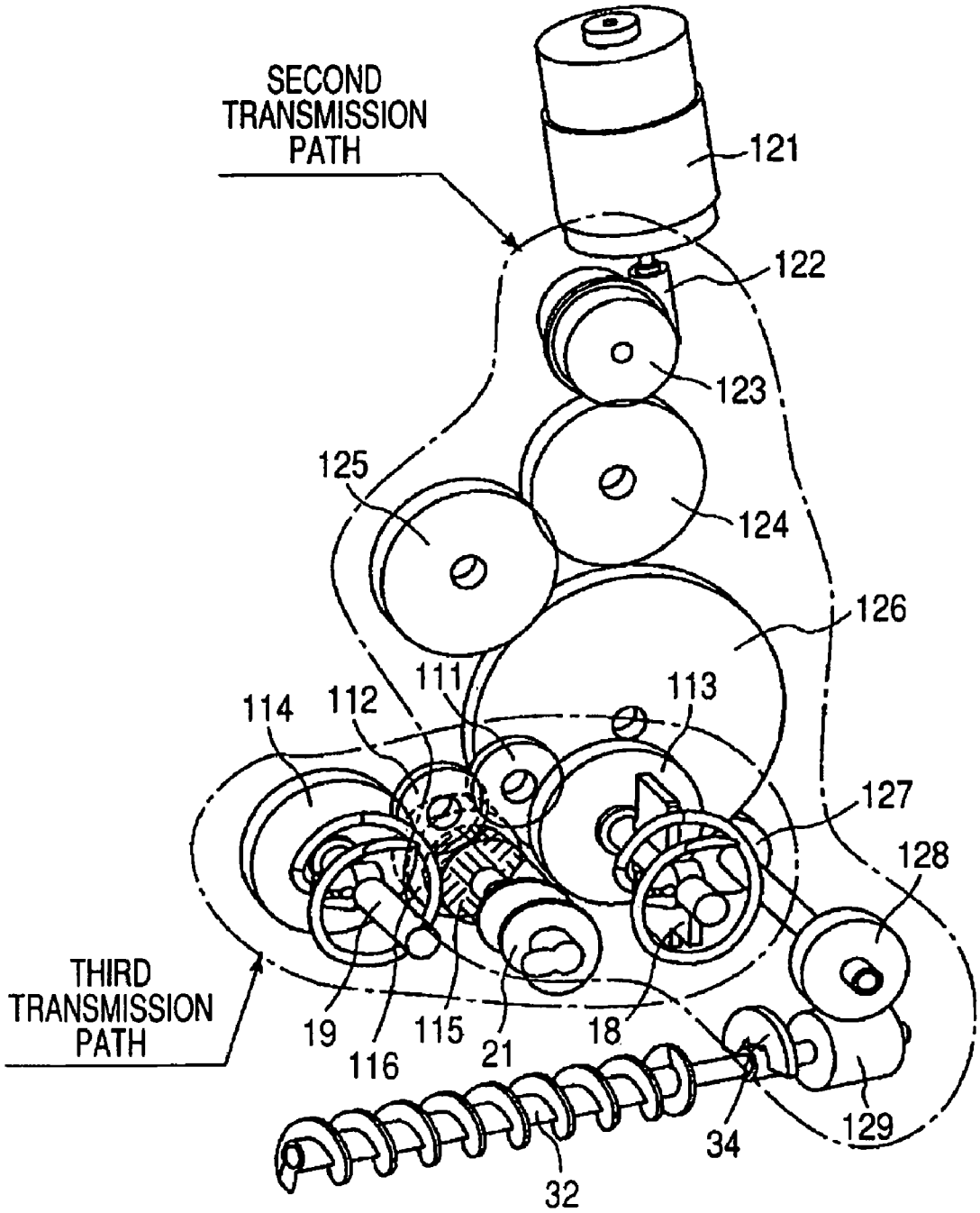
FIG. 10 illustrates driving of the toner replenishment apparatus by a hopper motor.
Figure 11:
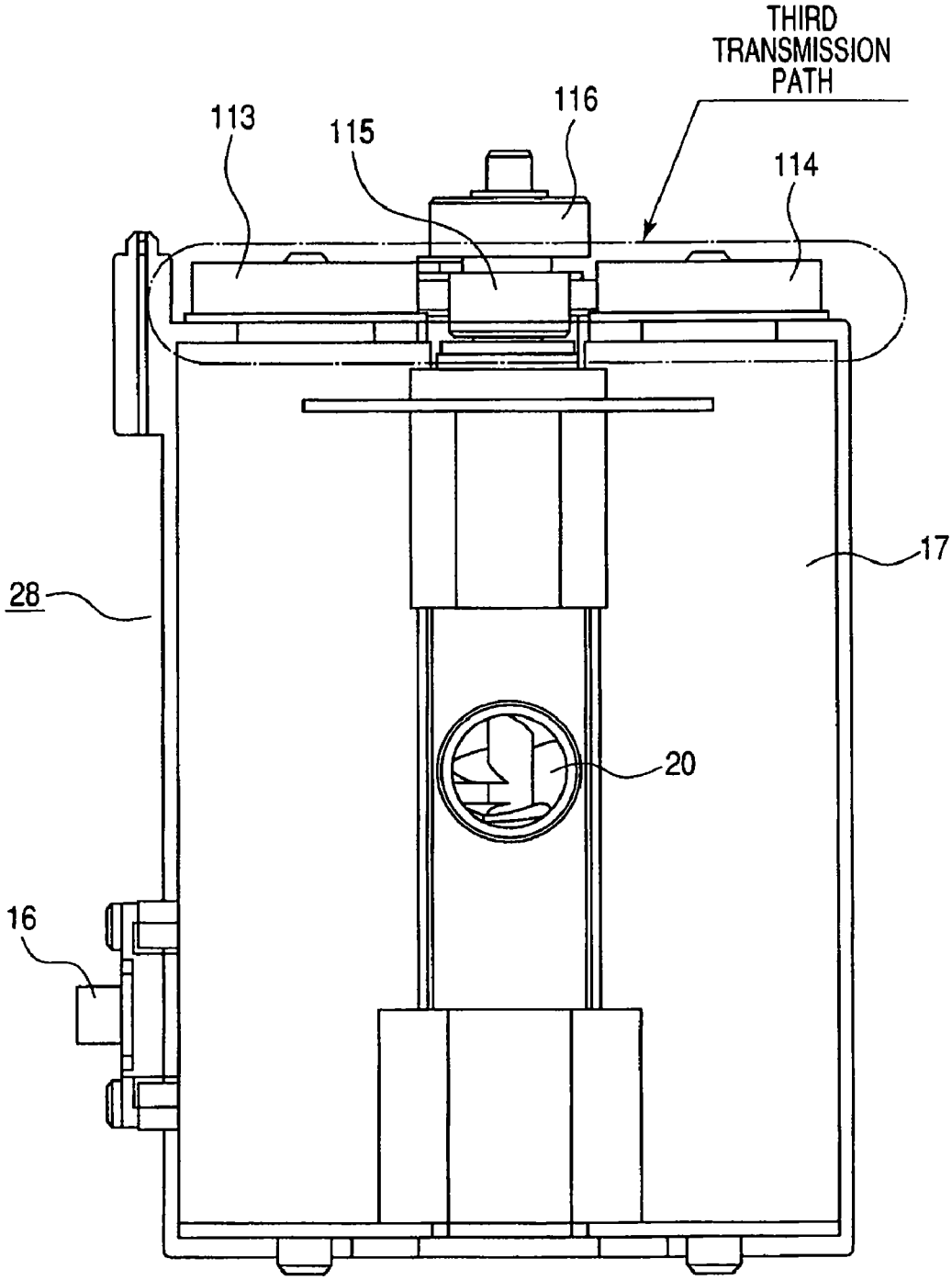
FIG. 11 is a bottom view showing of the buffer part.

FIG. 9 is a perspective view showing a driving system connected to a cartridge motor 101, and FIG. 10, a perspective view showing a driving system connected to a hopper motor 121.

To begin with, a first drive transmission path will be described with reference to FIG. 9.

The driving power supplied from the cartridge motor 101 is transmitted from a worm gear 102, which is connected to the cartridge motor 101, to a worm wheel 103 and further to an idler gear 104. It is then transmitted from the idler gear 104 to a gear 105, then via a coupling 106 connected to the gear 105, and further to a coupling 117 connected to the agitating vanes 40 of the toner cartridges 5 rotates the shaft 40a on which the agitating vanes 40 are provided.

In this way, the agitating vane 40 are driven on the first drive transmission path to channel replenishment of the toner idler parts 13 with the toner from the toner cartridges 5.

Next will be described a second drive transmission path with reference to FIG. 10.

The driving power supplied from the hopper motor 121 is transmitted from a worm gear 122, which is connected to the hopper motor 121, to a worm wheel 123 and further to an idler gear 124, an idler gear 125 and an idler gear 126 in that order. The transmission path is branched into one of transmission from the idler gear 126 to the buffer part 28 and the other to the replenishment pipes 14.

The driving power branched to the replenishment pipes 14 is first transmitted to a gear 127, and via a gear 128 fixed on the shaft of the gear 127 to a gear 129 provided on the shaft of the replenishment screw 32 to rotate the replenishment screw 32.

The driving power branched to the buffer part 28 is transmitted to a gear 116 to rotate the conveyance screw 21.

In this way on the second drive transmission path, actions to drive the conveyance screw 21 and the replenishment screw 32 to replenish the toner supply part 15A with the toner in the buffer part 28 are performed.

Next will be described a third drive transmission path with reference to FIG. 10 and FIG. 11.

The third drive transmission path is provided with a gear 113 to drive the first agitating screw 18, a gear 114 to drive the second agitating screw 19, a gear 115 which has a built-in one-way clutch and permits idling around or locking relative to the conveyance screw 21, an idler gear 112 to transmit the driving power from the gear 115 to the gear 114, and an idler gear 111 to transmit the driving power from an idler gear 112 to the gear 113.

The third drive transmission path can also receive driving power from the second drive transmission path or a fourth drive transmission path to be described afterwards. The actions of the replenishment screw 32 and the first and second agitating screws 18 and 19 when the driving power is transmitted from the second or fourth drive transmission path will be described below.

First, when the driving power is transmitted from the second drive transmission path, the conveyance screw 21 turns, and the gear 115 disposed on its shaft turns in the direction in which the one-way clutch is locked, resulting in rotation together with the conveyance screw 21. The driving power transmitted to the gear 115 is further transmitted to the idler gear 112, branched into a path of transmission from the gear 112 to the gear 114 and another of transmission from the gear 112 to the gear 111 and the gear 113, and turns the first and second agitating screws 18 and 19 respectively connected to the branched paths.

When the driving power is entered from the fourth drive transmission path to be described afterwards the power is inputted to the idler gear 112, and the idler gear 112 transmits the power to the gear 111, the gear 114 and the gear 115. This makes possible driving of the first and second agitating screws 18 and 19 in the same way as in the case where the driving power is entered from the second drive transmission path as described above.

Whether the driving power is entered from the second drive transmission path or from the fourth drive transmission path, the first and second agitating screws 18 and 19 turn in the same direction then, the second drive transmission path, they are set to turn about twice as fast when the driving power is entered from the fourth drive transmission path.

Further, as the one-way clutch turns in the idling direction, the gear 115 does not transmit the driving power to the conveyance screw 21, and accordingly the conveyance screw 21 does not turn.

Next will be described the fourth drive transmission path with reference to FIG. 9.

The fourth drive transmission path comprises a gear 107 fixed to the shaft, a gear 108 arranged on the shaft of the gear 107 and having a built-in one-way clutch, an idler gear 109 and an idler gear 110.

The fourth drive transmission path, too, can receive driving power from the first drive transmission path or the third drive transmission path.

First, when driving power is received from the first drive transmission path, the shaft fixed to the gear 107 turns as the gear 107 turns, and the gear 108 disposed on that shaft turns in the direction of locking the one-way clutch to turn together with the gear 107. The driving power transmitted to the gear 108 is transmitted to the idler gear 109 and the idler gear 110, and further to the idler gear 112, which is on the third drive transmission path.

Next, when driving power is transmitted from the third drive transmission path, the driving power is transmitted from the idler gear 112 to the idler gear 110 and the idler gear 109 and eventually to the gear 108. As the one-way clutch of the gear 108 is then turned in the idling direction, no driving power is transmitted to the gear 107.

As described so far, even though driving force is entered from both motors 101 and 121 over the first through fourth drive transmission paths, the driving power is not transmitted to the other motor because the gear 108 or the gear 115 idles to cut off the driving power.

Further, when both of the two motors 101 and 121 drive at the same time, as it is so set that the driving power from the hopper motor 121 provides faster rotation on the third drive transmission path, the gear 115 is locked to give priority to the power input from the second drive transmission path. Though the driving power is then transmitted from the third drive transmission path to the fourth drive transmission path, the gear 108 idles to cut off the driving power because the gear 108 turns faster than the gear 107. This enables the cartridge motor 101 to drive the agitating vanes 36 even when the two motors drive at the same time.

Although the gear 112 constitutes the input position from the fourth drive transmission path to the third drive transmission path in this embodiment, if the idler gear 109 and the idler gear 110 gear trains consist of an odd number of units, the power may as well be directly inputted to the gear 114.

As described above, the driving of the toner cartridges 5 and the toner idler parts 13 is controlled by the idling and locking of two one-way clutches in this first Embodiment.

Next will be described the drive lock mechanism of the buffer part 28 in this embodiment with reference to FIGS. 12A, 12B and 12C.

Figure 8:
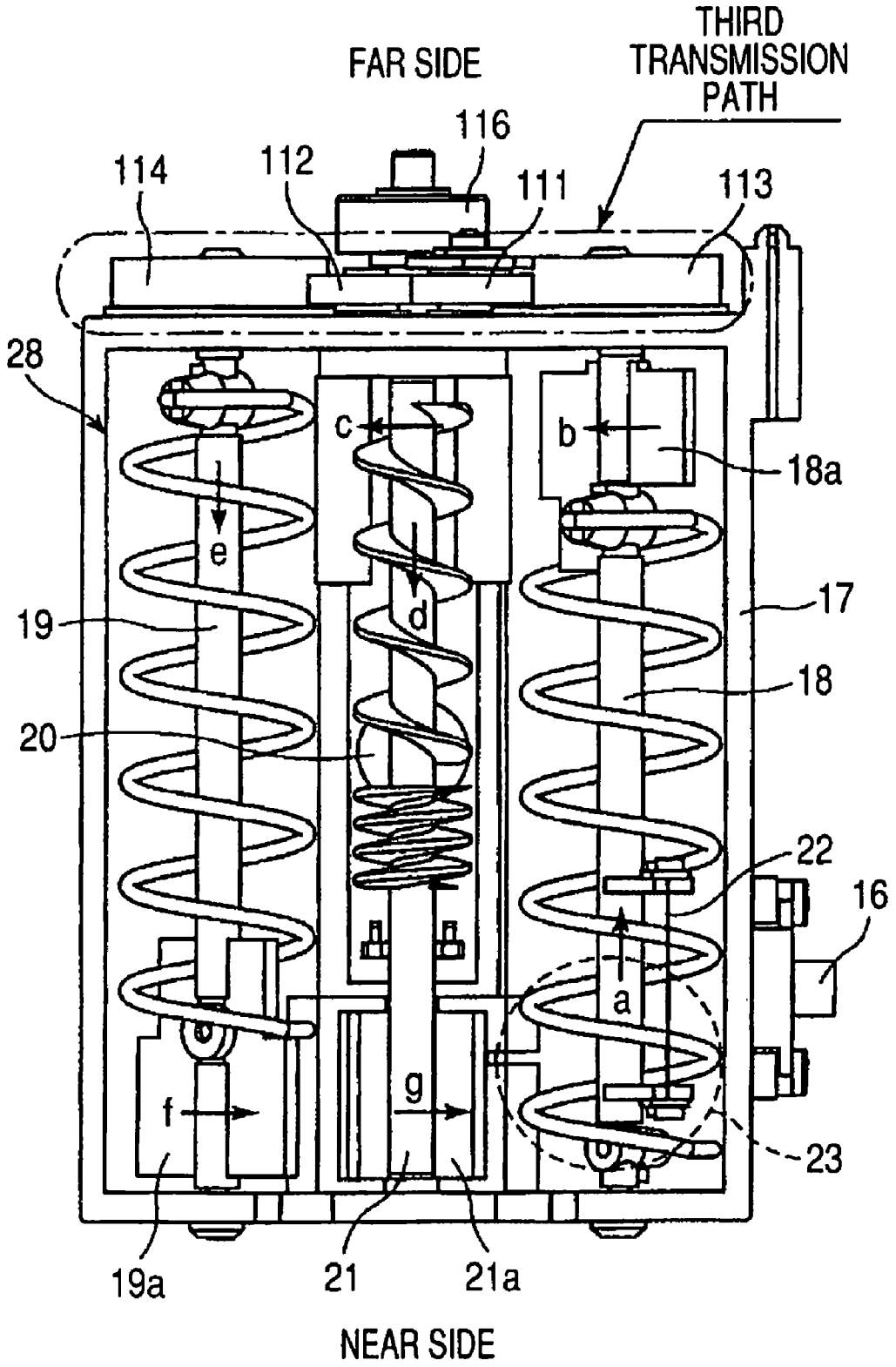
FIG. 8 is an overhead view showing a buffer part.

In the configuration of this embodiment, a cleaning spring 22 is disposed on the shaft of the agitating screw 18 as shown in FIG. 8, and it turns together with the agitating screw 18 to scrape off any toner stuck to the sensing face of the toner sensor 16 and thereby to prevent erroneous detection by the sensor.

Figure 12A:
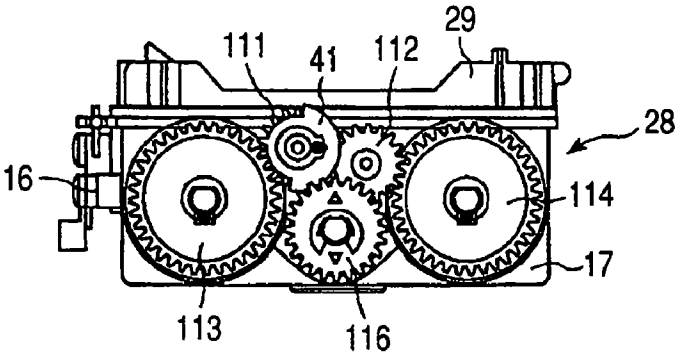
FIG. 12A shows the drive lock mechanism of a buffer part 28 during normal operation.
Figure 12B:
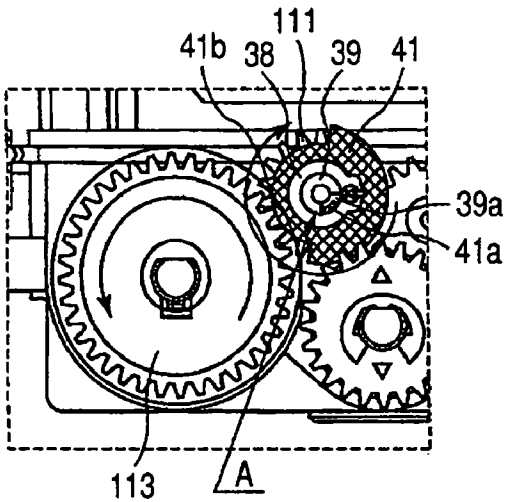
FIG. 12B, an expanded view showing an idler gear 111 and a gear 113 in the drive lock mechanism of the buffer part 28 during normal operation.
Figure 12C:
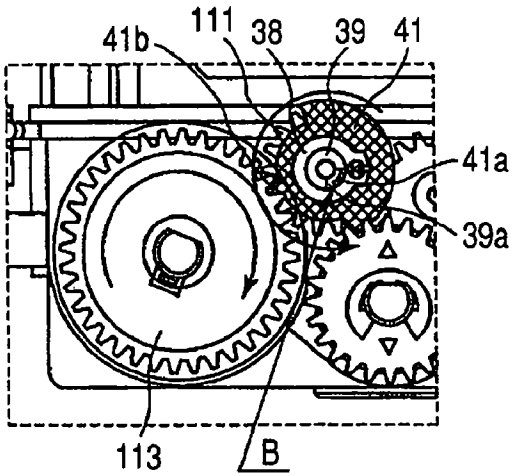
FIG. 12C, an expanded view showing the idler gear 111 and the gear 113 in the drive lock mechanism of the buffer part 28 in a locked state.

Further, as shown in FIGS. 12A, 12B and 12C, a flag 37 for preventing the gear 113 from reversing is disposed on the shaft 39 of the idler gear 111 provided on the buffer container 17 on the driving side of the buffer part 28, and a frictional member (not shown) is arranged between the idler gear 111 and the flag 41. By fixing the thrust position of the flag with a stopper 38 and crushing the frictional member to a prescribed extent, a moderate load can be applied between the idler gear 111 and the flag 41, and the flag 41 is so disposed as to turn in synchronism with the rotation of the idler gear 111. The flag 41 also has a stub to engage with a groove in the shaft 39.

Since the buffer part 28 is usually fitted to the hopper, namely the body of the toner replenishment apparatus 5A, it is not driven in the reverse direction, but when the buffer part 28 is isolated at the time of servicing or assembling, each gear provided in the buffer part 28 could be reversed manually, and accordingly the cleaning spring 22 can be reversed. Its reversing may result in catching the cleaning spring 22 and therefore invite damage.

This flag 41 is intended to prevent the gear 113 from reversing on such an occasion. As shown in FIG. 12B, when the hopper is incorporated into the buffer part 28 for use in normal operation, though the idler gear 111 and the gear 113 turn in the direction of the arrow as shown in the part of the drawing illustrating the normal operation, the flag, 41 is then caused by the friction of the frictional member to turn following the rotation of the idler gear 111 until it reaches the illustrated position. Then, a projection 41a of the flag 41 hits the wall of a groove 39a in the shaft 39 (position "A" in the normal operation shown in FIG. 12B) to stop the following rotation of the flag 41, which then stops in the illustrated position.

When the buffer part 28 is in an isolated state and its gears are reversed, the idler gear 111 and the gear 113 turn in the direction of the arrow as in the state of being "locked" shown in FIG. 12C, and the flag 41 turns following the idler gear 111 in the turning direction of the gear 111 from the position in which it was at halt during "normal operation" to the position of being "locked" shown in FIG. 12C. The projection 41a of the flag 41 hits the wall of the groove in the shaft 39 (position "B" in FIG. 12C), ceases the following turn, and stops in the illustrated position. The tip of the flag 41, provided with a projection 41b which engages with the tooth face of the gear 113, then stops the rotation of the gear 113 and thereby prevents the agitating screw 18 from reversing.

The configuration of this embodiment has a first driving system which drives the agitating vanes 36 and the agitating screws 18 and 19 at the same time and keeps the conveyance screw 21 at halt in the toner replenishment apparatus 5A having a buffer part which circulatively conveys the developer for replenishment, and a second driving system which drives the agitating screws 18 and 19 and the conveyance screw 21 at the same time. Therefore, it is possible, when a toner is to be supplied from a toner cartridge, to soften the toner heap in the dropping position of the toner, and thereby to prevent blocking even when a less fluid toner is used.

Furthermore, since the first driving system can securely convey the toner to the toner sensor 16, erroneous detection by the toner sensor 16 can be prevented.

Moreover, even at the time of replenishment from any of the toner cartridges 5, as the toner within the buffer part 28 is evenly flattened by the agitating screws 18 and 19, the bulk density in the buffer part 28 is stabilized to reduce fluctuations in the quantity of replenishment.

Second Embodiment

Next, a second preferred embodiment of the present invention will be described in detail with reference to FIG. 13.

The second Embodiment, in which the configurations of the toner cartridges 5, the toner idler parts 13 and the toner supply part 15A and the toner conveyance path are the same, differs only in the driving system configuration. Therefore, only the drive transmission path will be described with respect to second Embodiment.

Figure 13:
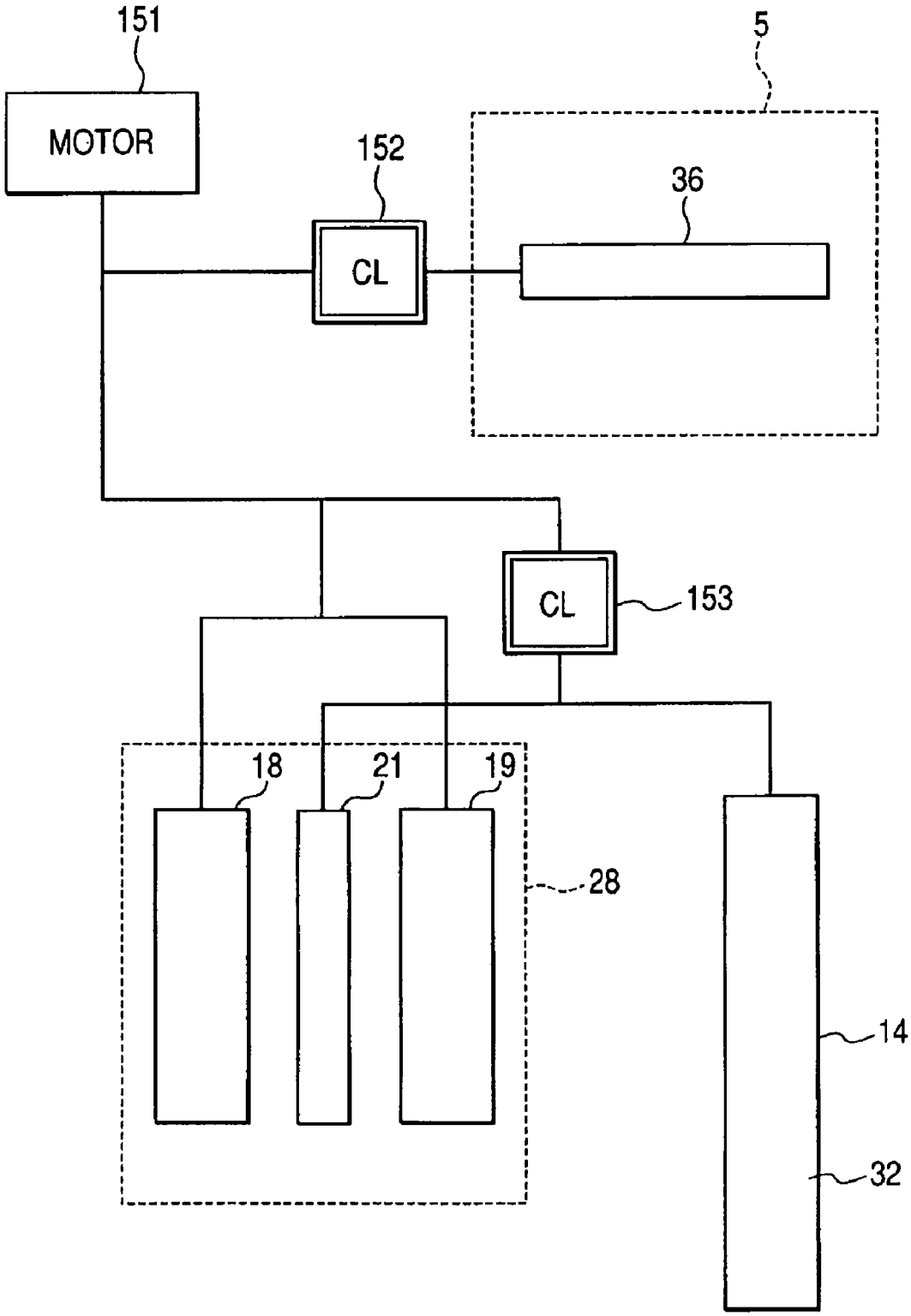
FIG. 13 shows the mode of driving a toner replenishment apparatus, which is another preferred embodiment of the invention.
Figure 14:
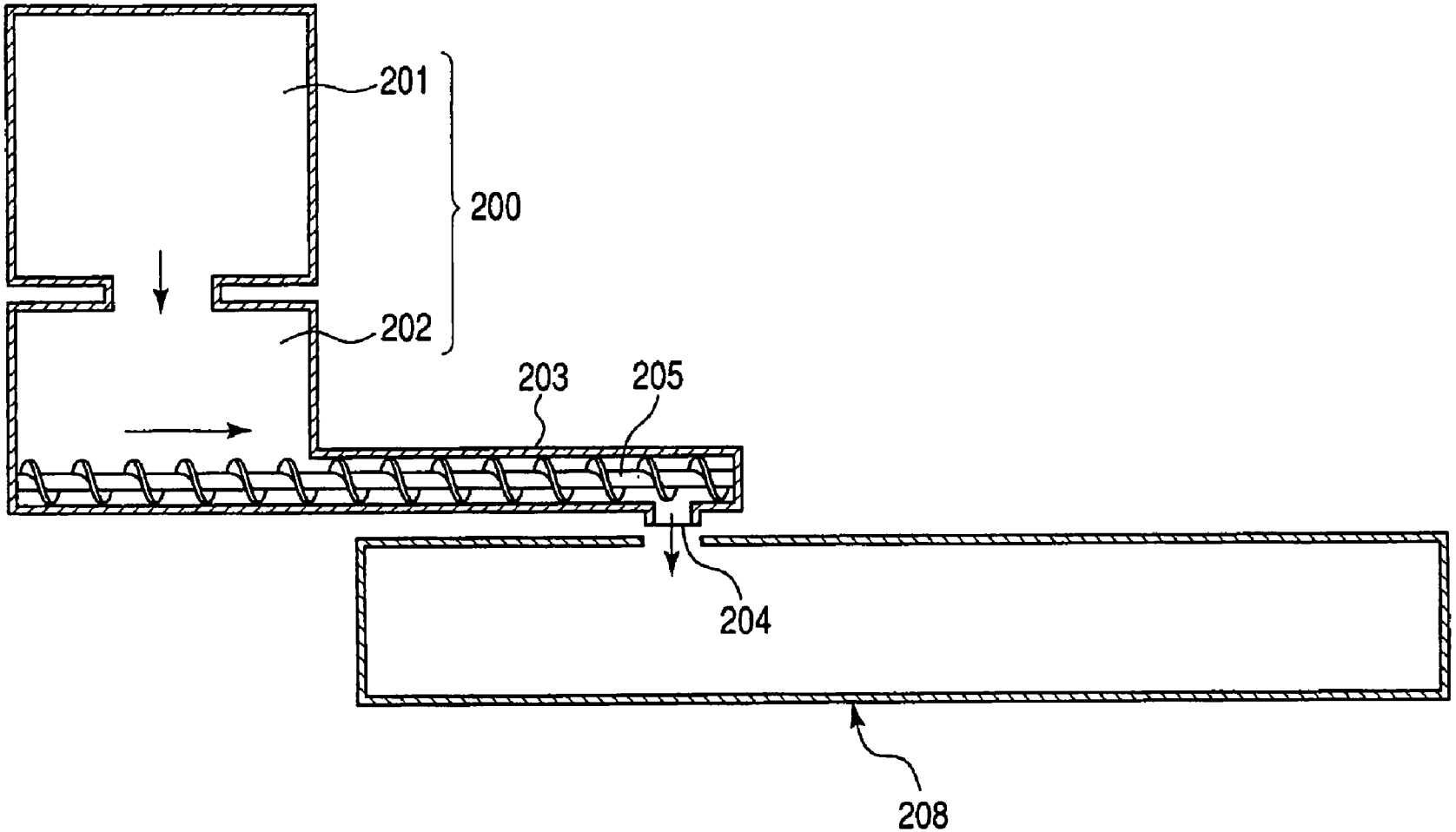
FIG. 14 is a schematic configuration diagram illustrating a conventional toner replenishment apparatus.
Figure 15:
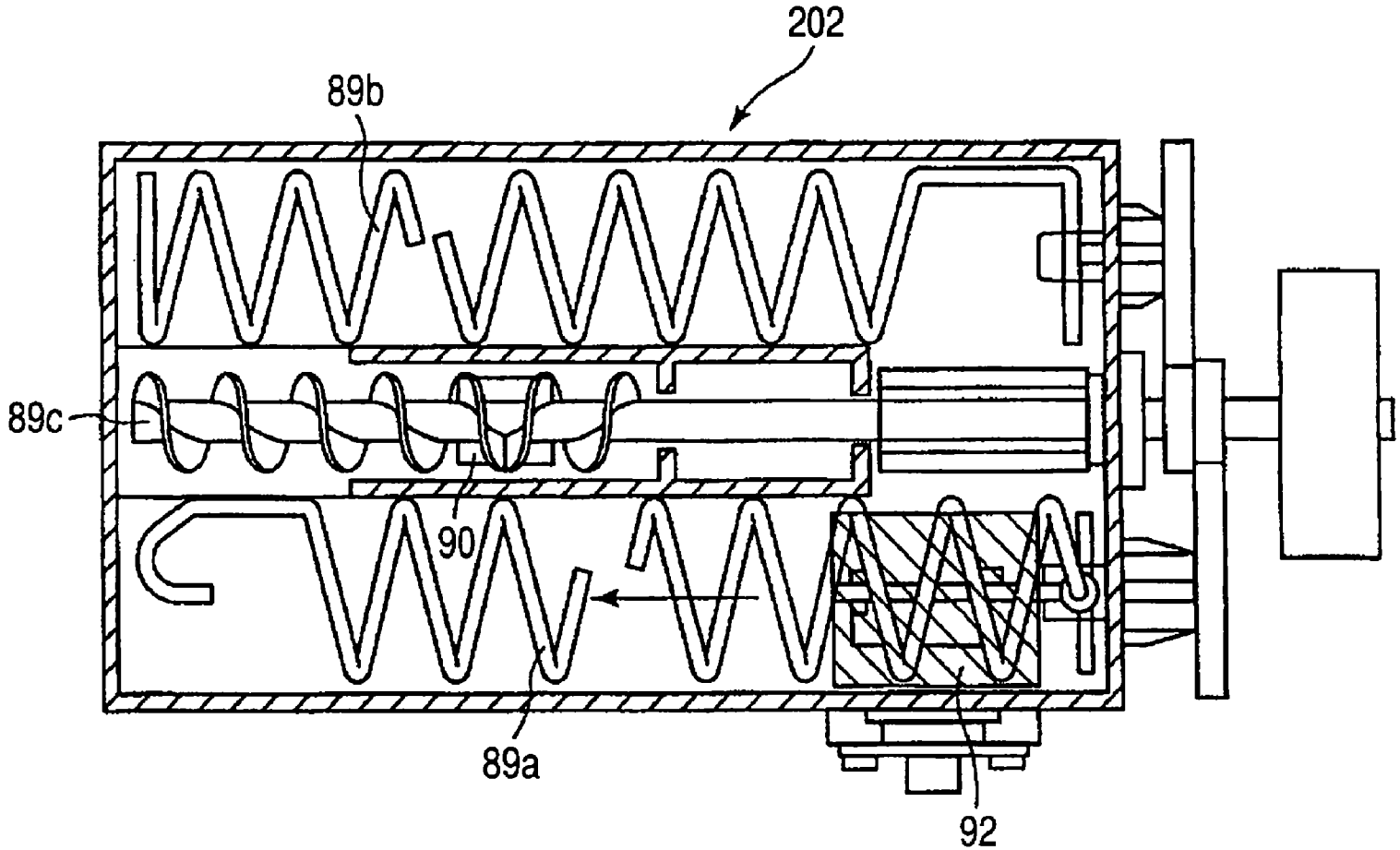
FIG. 15 is an overhead view illustrating a buffer part of the conventional toner replenishment apparatus.

FIG. 13 shows the drive transmission path of the toner idler parts 13 in this second Embodiment.

The driving system configuration of the toner idler parts 13 in this embodiment comprises a motor 151 which turns in one direction all the time, a first electromagnetic clutch 152 disposed as the first drive switching means on the shaft of the agitating vanes 36, and a second electromagnetic clutch 153 disposed as the second drive switching means on the drive transmission path for transmitting driving power to the conveyance screw 21 and the replenishment screw 32.

The operation of the toner replenishment apparatus 5A in this second Embodiment will be described below.

First will be described the actions of toner replenishment from the toner cartridges 5 to the toner idler parts 13.

When the toner idler parts 13 are to be replenished with the toner from the toner cartridges 5, irrespective of whether the second electromagnetic clutch 152 is on or off, the first electromagnetic clutch is turned on to transmit the driving power to the agitating vanes 36 to replenish the toner idler parts 13 with the toner. The first and second agitating screws 18 and 19 then receive the driving power directly from the motor 151 and rotate to soften the toner heap in the buffer part 28.

Next will be described the replenishment of the toner supply part 15A with the toner from the toner idler parts 13.

When the toner supply part 15A is to be replenished with the toner from the toner idler parts 13, irrespective of whether the first electromagnetic clutch 152 is on or off, the second electromagnetic clutch 153 is turned on when driven by the motor 151, and transmission of the driving power to the conveyance screw 21 and the replenishment screw 32 causes the conveyance screw 21, the replenishment screw 32 and the first and second agitating screws 18 and 19 to turn, thereby to replenish the toner supply part 15A.

Next, when the toner supply part 15A is to be replenished with the toner from the toner idler parts 13 while the toner idler parts 13 are being replenished with the toner from the cartridges 5, both the first electromagnetic clutch 152 and the second electromagnetic clutch 153 are turned on to transmit the driving power to the agitating vanes 36, the conveyance screw 21, the replenishment screw 32 and the first and second agitating screws 18 and 19.

Thus the driving of the toner cartridges 5 and the toner idler parts 13.is controlled in this second Embodiment by switching the electromagnetic clutches.

Although, with respect to the embodiments hitherto described, the toner replenishment apparatus according to the present invention has been described as being applicable to an image forming apparatus equipped with a rotary developing apparatus, the invention is not limited to such applications, but can be similarly applied with similar effectiveness to an image forming apparatus equipped with a photosensitive drum and a developing apparatus in which four image forming units for the formation of developer images (toner images) in four colors including yellow (Y), magenta (M), cyan (C) and black (Bk) are arranged in tandem along an intermediate transferring belt and an image forming apparatus in which developing apparatuses for yellow (Y), magenta (M), cyan (C) and black (Bk) are arranged around a photosensitive drum.

This application claims priority from Japanese Patent Application No. 2004-306264 filed on Oct. 20, 2004, which is hereby incorporated by reference herein.

What is claimed is:

1. A developer replenishment apparatus for supplying a developer for replenishment to a developing apparatus to develop an electrostatic image formed on an image bearing member with the developer, comprising:

a first developer container for accommodating [said] *the* developer for replenishment;

a rotatable conveyance member disposed in [the] *said* first developer container to discharge [said] *the* developer for replenishment through [a first] *an* opening of said first developer container;

a second developer container for receiving [said] *the* developer for replenishment discharged from said [first] opening *of said first developer container*;

a rotatable agitating member disposed in [the] *said* second developer container to agitate [said] *the* developer for replenishment;

a rotatable conveyance screw disposed in said second developer container to discharge [said] *the* developer for replenishment through [a second] *an* opening of said second developer container toward said developing apparatus; [and]

driving means which generates a rotational driving force; *and* a driving transmission mechanism which has a plurality of driving force transmission paths connected with said driving means and controls transmission of the rotational driving force to each of said rotatable conveyance member, said rotatable agitating member and said rotatable conveyance screw, by switching one of the driving force transmission paths to another of the driving force transmission paths, wherein said driving transmission mechanism has a path which does not transmit the rotational driving force to said rotatable conveyance screw in a case where the rotatable driving force is simultaneously transmitted to said rotatable conveyance member and said rotatable agitating member,

*wherein said driving transmission mechanism has a path which transmits the rotational driving force in a case where the rotational driving force is simultaneously transmitted to said rotatable conveyance screw and said rotatable agitating member, and*

*wherein a rotation speed of said rotatable agitating member when said rotatable agitating member and said rotatable conveyance member are simultaneously rotated is lower than a rotation speed of said rotatable agitating member when said rotatable agitating member and said rotatable conveyance screw are simultaneously rotated.*

[2. A developer replenishment apparatus according to claim 1, wherein said driving transmission mechanism has a path which transmits the rotational driving force in a case where the rotational driving force is simultaneously transmitted to said rotatable conveyance screw and said rotatable agitating member.]

3. A developer replenishment apparatus according to claim 1, wherein said rotatable agitating member includes a first agitating member and a second agitating member each of which is arranged on each of both sides of said rotatable conveyance screw and causes [said] *the* developer for replenishment to circulate in said second developer container.

[4. A developer replenishment apparatus according to claim 2, wherein a rotation speed of said rotatable agitating member when said rotatable agitating member and said rotatable conveyance member are simultaneously rotated is lower than a rotation speed of said rotatable agitating member when said rotatable agitating member and said rotatable conveyance screw are simultaneously rotated.]

*5. A developer replenishment apparatus for supplying a developer for replenishment to a developing apparatus to develop an electrostatic image formed on an image bearing member with the developer, comprising:*

*a first developer container for accommodating the developer for replenishment;*

*a rotatable conveyance member disposed in said first developer container to discharge the developer for replenishment through an opening of said first developer container;*

*a second developer container for receiving the developer for replenishment discharged from said opening of said first developer container;*

*a rotatable agitating member disposed in said second developer container to agitate the developer for replenishment;*

*a rotatable conveyance screw disposed in said second developer container to discharge the developer for replenishment through an opening of said second developer container toward said developing apparatus;*

*driving means which generates a rotational driving force; and*

*a driving transmission mechanism which has a plurality of driving force transmission paths connected with said driving means and controls transmission of the rotational driving force by switching one of the driving force transmission paths to another of the driving force transmission paths,*

*wherein the plurality of driving force transmission paths includes a driving force transmission path which transmits a drive force to said rotatable agitating member without transmitting the drive force to said rotatable conveyance screw, when the drive force is transmitted to said rotatable conveyance member,*

*wherein the plurality of driving force transmission paths includes a path which transmits a drive force to said rotatable conveyance screw and said rotatable agitating member, and*

*wherein a rotation speed of said rotatable agitating member when said rotatable agitating member and said rotatable conveyance member are simultaneously rotated is lower than a rotation speed of said rotatable agitating member when said rotatable agitating member and said rotatable conveyance screw are simultaneously rotated.*

*6. A developer replenishment apparatus according to claim 5, wherein said rotatable agitating member includes a first agitating member and a second agitating member, and*

*wherein each of the first agitating member and the second agitating member is arranged on each of both sides of said rotatable conveyance screw and causes the developer for replenishment to circulate in said second developer container.*

*7. A developer replenishment apparatus according to claim 5, wherein said driving means has a first driving source for respectively rotating and driving said rotatable conveyance member and said rotatable agitating member and a second driving source for respectively rotating and driving said rotatable conveyance screw and said rotatable agitating member.*

* * * * *